UNITED STATES PATENT OFFICE.

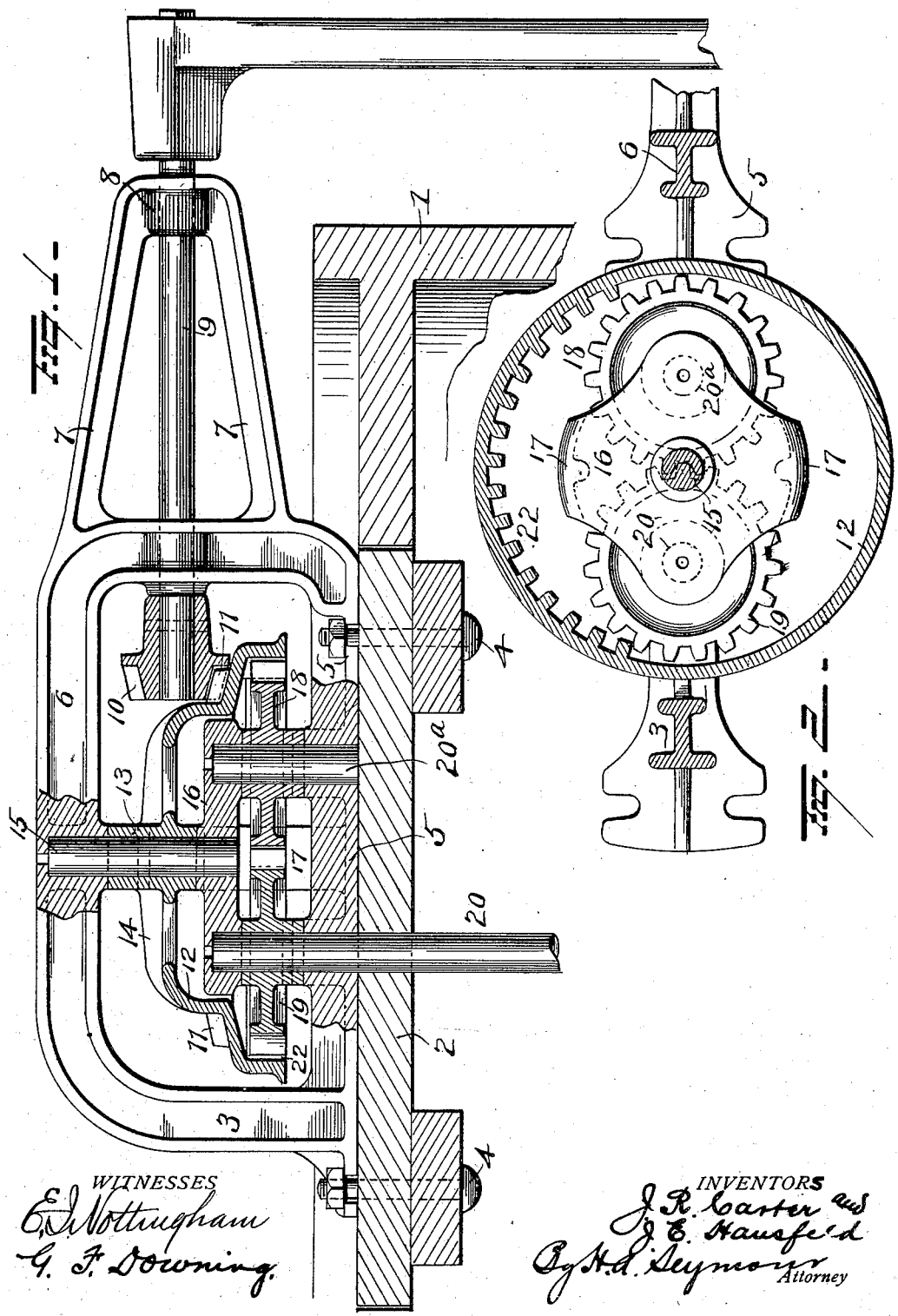

JOHN R. CARTER, OF AUGUSTA, KENTUCKY, AND JOSEPH E. HAUSFELD, OF CINCINNATI, OHIO, ASSIGNORS TO ERNST H. HUENEFELD, OF CINCINNATI, OHIO.

GEARING.

SPECIFICATION forming part of Letters Patent No. 708,315, dated September 2, 1902.

Application filed October 31, 1901. Serial No. 80,690. (No model.)

*To all whom it may concern:*

Be it known that we, JOHN R. CARTER, of Augusta, in the county of Bracken and State of Kentucky, and JOSEPH E. HAUSFELD, of Cincinnati, in the county of Hamilton and State of Ohio, have invented certain new and useful Improvements in Gearing; and we do hereby declare the following to be a full, clear, and exact description of the invention, such as will enable others skilled in the art to which it appertains to make and use the same.

Our invention relates to an improvement in gearing, and more particularly to gearing for washing-machines, churns, and the like, the object of the invention being to provide improved gearing and so mount the same as to transmit motion to alternately rotate a gear in opposite directions.

A further object is to provide improvements of this character for a washing-machine to alternately rotate the dasher in opposite directions by the expenditure of a minimum amount of power.

With these objects in view the invention consists in certain novel features of construction and combinations and arrangements of parts, as will be now fully hereinafter described, and pointed out in the claims.

In the accompanying drawings, Figure 1 is a view in elevation, partly in section, illustrating our improvements, and Fig. 2 is a view in section on the line *x x* of Fig. 1.

1 represents the upper portion of the body of a washing-machine, and 2 a lid or cover therefor. On lid or cover 2 a metal frame 3 is secured by bolts 4, as shown, and comprises a base 5, secured against the upper face of lid 2 and having an integral arched bracket 6, the latter provided at one side with outwardly projecting and converging arms 7, integral with a bearing 8 at their outer ends. In bearing 8 and also in a bearing in one side of bracket 6, alining therewith, a drive-shaft 9 is supported and may be driven by a crank or other desired means and has secured thereon, inside frame 3, a bevel-gear 10. This gear 10 meshes with bevel-teeth, forming a rack 11 around the upper face of a large hollow wheel or ring 12, having a central bearing 13, secured in the open wheel or ring by a spider 14. This bearing 13 is secured on a short vertical shaft 15, supported at its upper end in a bearing in bracket 6 and at its lower end in a bearing in a plate 16. The latter, which is preferably of the shape shown, is secured to the base 4 of the frame through the medium of standards 17 to support the plate in a horizontal position a proper distance from the base.

The wheel or ring 12 is in the general form of an inverted saucer, the lower portion comprising a vertical wall which is inclined inward and slightly upward at its upper end and then projects upward in a comparatively straight line and curves inward, where it joins the arms of the spider 14. The extreme lower portion of the wheel or ring 12 is made with an internal mutilated gear 22, comprising a series of teeth extending around slightly less than one-half of the wheel to alternately engage intermeshing gears 18 and 19. Gear 18 is secured on a short vertical shaft $20^a$, mounted in similar bearings in plate 16 and base 5, and the gear 19 is secured on the dasher rod or shaft 20, projecting up through base 5 and supported in a suitable bearing in plate 16.

The operation of our improvements is as follows: The shaft 9 is turned in either direction by the crank or other means, and the bevel-gear 10 thereon, meshing with rack 11, transmits motion to revolve wheel or ring 12, which latter is therefore continuously revolved in either direction. As this wheel or ring 12 is revolved the mutilated gear 22 thereon will alternately engage gears 18 and 19 to alternately propel the driven shaft in opposite directions, as will now be explained. When gear 22 is in mesh with gear 18, it will turn the same in one direction, and the latter, meshing with gear 19, drives the gear 19 in the reverse direction; but when the mutilated gear 22 has moved far enough to free itself from gear 18 it will engage gear 19 and drive the same in the direction opposite to that which it was turned by gear 18, and it will be seen that as the wheel or ring 12 alternately engages gears 18 and 19 the direction of rotation of the dasher will be changed twice at every complete revolution